Aug. 23, 1932.  L. D. KAY  1,873,600
TRUCK WHEEL
Filed Nov. 4, 1930
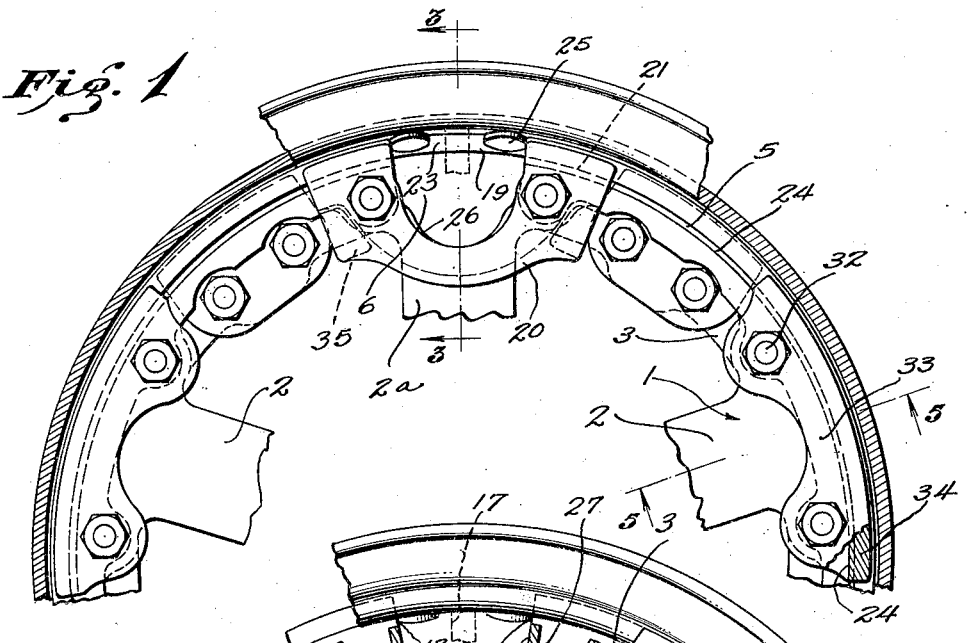
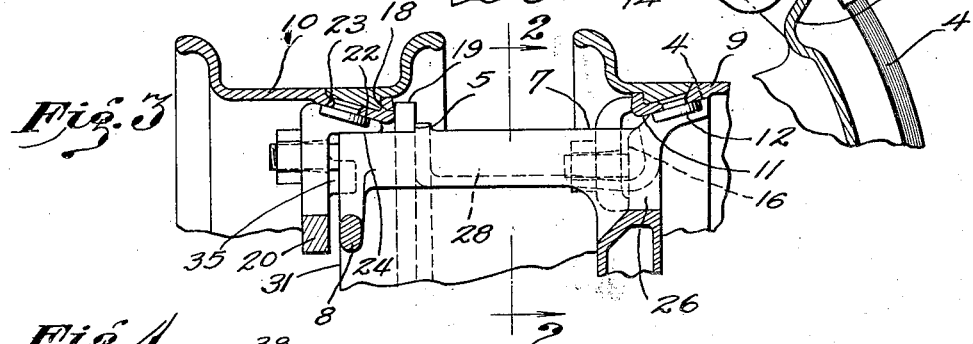
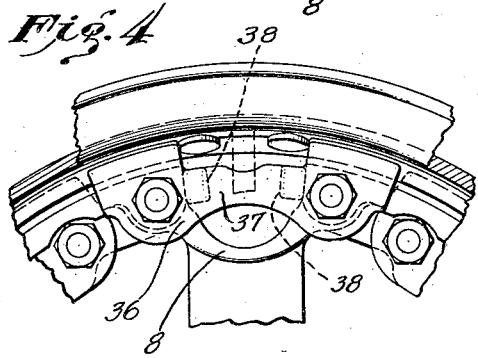
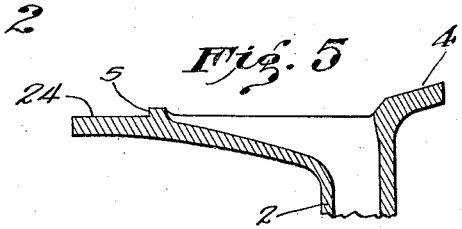
INVENTOR.
LLOYD D. KAY
BY Lyon & Lyon
ATTORNEYS.

Patented Aug. 23, 1932

1,873,600

UNITED STATES PATENT OFFICE

LLOYD D. KAY, OF LOS ANGELES, CALIFORNIA, ASSIGNOR TO KAY-BRUNNER STEEL PRODUCTS INC., A CORPORATION

TRUCK WHEEL

Application filed November 4, 1930. Serial No. 493,345.

This invention relates to truck wheels and is particularly adapted for use in the construction of pneumatic dual tired truck wheels. In mounting the tires of such wheels on the wheel it is necessary to provide for driving the tire from the felloe of the wheel and it is also necessary in the case of pneumatic tires, to provide a construction for the felloe which will prevent the inflating nipples on the tires from interfering with the mounting of the tire rims and tires.

The general object of this invention is to provide a construction for wheels of this kind which will effect a good driving connection for the inboard tire and for the outboard tire, and with the parts constructed in such a way as to enable identical tire rims to be employed for the inboard side and for the outboard side of the wheel.

Another object of the invention is to provide a construction for a wheel of this type which will give an effective driving connection for dual tires and at the same time provide for ready accessibility of the inflating nipples of the tires.

A further object of the invention is to improve the general construction of wheels of this type particularly as regards the driving connection and the means for securing the tire rims on the wheels.

Further objects of the invention will appear hereinafter.

The invention consists of novel parts and combinations of parts to be described hereinafter, all of which contribute to produce an efficient truck wheel.

A preferred embodiment of the invention is described in the following specification, while the broad scope of the invention is pointed out in the appended claims.

In the drawing:

Figure 1 is a side elevation showing a portion of the outboard side of a wheel embodying the invention, certain parts being broken away, and with the outboard tire rim shown partially broken away and in section.

Figure 2 is a vertical section taken about on the line 2—2 of Figure 3, and particularly illustrating the means for mounting and driving the inboard tire rim, certain parts being broken away.

Figure 3 is a vertical section taken about on the line 3—3 of Figure 1 and further illustrating the driving connection for the inboard and outboard tire rims.

Figure 4 is similar to Figure 1 but shows another embodiment of the invention.

Figure 5 is a cross-section on the line 5—5 of Figure 1 illustrating the shape of the typical cross-section of the felloe.

In practicing the invention I provide a felloe having a gap passing from the outboard side of the wheel to the inboard side. This felloe is provided with a seat for the inboard tire rim and a seat for the outboard tire rim. The inboard tire rim is provided with driving means engaged by the side wall of the gap.

On the outboard side of the wheel I provide means for engaging the driving means of the outboard rim and this means is preferably provided with means for engaging the outboard tire rim to assist in holding the same on its seat.

The outboard rim is mounted against a stop ring that is removable to enable the inboard rim to be passed to the inboard side of the wheel.

Referring more particularly to the parts, 1 indicates an automobile wheel which may be formed with spokes indicated generally by the reference numeral 2, and carrying a felloe 3 of skeleton form, and presenting an inboard tire rim seat 4 of substantially conical form and an outboard annular stop shoulder 5. The felloe 3 is formed at a point on its circumference with a transverse gap 6 which is preferably of substantially U-form. This gap presents a side face or cheek 7 at each side of the gap. At the outboard side of the wheel a subsantially U-shaped bar 8 is formed that braces the outboard side of the wheel at this point.

The inboard tire rim 9 as regards its features enabling it to seat on the felloe, is constructed identically with the outboard tire rim 10. The inboard time rim has a conical seat face 11 that seats upon the inboard conical seat face 4. At this part of the tire rim, driving means are provided to engage with the faces 7 at opposite sides of the gap 6. For this purpose I prefer to employ two rivets 12 having their heads slightly flattened at the points 13, if desired, to present flat faces for engaging the faces 7.

After the inboard rim 9 has been seated it is secured on its seat by means of a plurality of double lugs 14, each double lug being provided with two openings to receive studs 15 that are set in the face 16 of the wheel (see Figure 3).

If the tires to be carried on the rim are pneumatic tires, the inflating nipple would be located at the point indicated by the dotted lines 17 in Figure 2.

The outboard tire rim 10, as stated above, is substantially like the inboard tire rim but it is mounted in a reverse position. In other words, the annular clamping shoulder 18 of the outboard tire rim is located toward the inboard side. This shoulder seats against a removable stop ring 19 which slides over the outboard side of the wheel and comes against the annular stop shoulder 5.

The outboard tire rim, after being set up against the stop ring 19, is clamped in place at the gap by means preferably consisting of a yoke 20 having a pair of wedge tongues 21 with inclined radially outer faces 22 that engage the inclined seat face 23 of this rim, the radially inner faces of the wedge tongues 21 being cylindrical in form and seating against the cylindrical face 24 at the outboard side of the wheel.

The yoke 20 is curved, and may be of substantially U-shape form so as to conform in outline to the U-shaped connecting bar 8 that connects the sides of the gap. This yoke 20 at each end is constructed so that its edge operates as driving means to engage driving means on the rim, such as the rivets 25 (see Figure 1) that correspond to the rivets 12 already referred to. In this way driving is effected from the yoke to the outboard tire rim.

The curved bar 8 ties together and braces the edges of the circumferential faces 24 of the felloe. The gap 6 is preferably located in line with a special spoke 2a of the wheel, the outer end of which is formed with a wide notch or recess 26 (Figure 3) to form the bottom of the U formed by the gap 6. At each side of the gap the felloe is formed with two transverse U-shaped channels 27 that connect the outboard portion of the felloe to the inboard portion. These channels are deepest at the inboard side of the wheel and taper off to about the location of the annular shoulder 5, as indicated by the dotted lines 28 of Figure 3.

The felloe of the wheel is formed with openings as at 29, Figure 2, to receive the lugs 14 for the inboard tire rim. At the sides of the typical spokes 2 of the wheel transverse channel shaped webs 30 are provided which extend toward the outboard side of the wheel and terminate in line with the outboard face 31 of the wheel, at which point studs 32 are provided to receive typical clamping lugs 33 (see Figure 1). Each of these clamping lugs is provided with a curved wedge shaped tongue 34 to engage over the circumferential face 24 at the outboard side of the wheel.

In order to impart the driving movement to the yoke 20 from the wheel and reduce the strain on the studs 15, I prefer to provide the yoke 20 with two dogs 35 (see Figures 1 and 3). These dogs project in toward the inboard side of the wheel from the inboard face of the yoke 20 and engage the outside faces of the U-shaped bar 8.

In Figure 4 I illustrate another embodiment of the invention in which the felloe is constructed in the same way as illustrated in Figures 1, 2 and 3, but instead of having the yoke 20 of U-shaped form, I construct it as indicated by the yoke 36 in Figure 4. This yoke is formed with a cross bar 37 that is formed along a circumferential line with respect to the center of the wheel, and bar 37 is provided on its inner face with two dogs 38 that extend inwardly toward the inboard side of the wheel and engage against the cheeks 7 of the U-shaped gap 6 that passes through the felloe.

It is understood that the embodiment of the invention described herein is only one of the many embodiments this invention may take, and I do not wish to be limited in the practice of the invention, nor in the claims, to the particular embodiment set forth.

I claim:

1. In a driving connection for a dual tired pneumatic truck wheel, the combination of a felloe having a gap in the radially outer face thereof capable of passing the inflating nipple for the inboard tire, an outboard tire rim seating on the felloe and having driving means located in the gap and projecting radially inwardly toward the axis of the wheel, a yoke having driving means for engaging the driving means of the rim on opposite sides of the gap, and studs located on opposite sides of the said gap for securing the said yoke in position.

2. In a driving connection for a truck wheel, the combination of a felloe having a gap in the radially outer face thereof, said felloe having an integral stop shoulder located toward the outboard side, removable stop-means seating against the shoulder and disposed circumferentially on the felloe, an outboard tire rim constructed to pass over the outboard end of the wheel to seat against the said stop-means, said rim having driving means located in the gap and projecting radially inwardly toward the axis of the wheel, a yoke having means for engaging the tire rim to force the same against the stop-means, and having driving means for engaging the said driving means of the rim, and studs located on opposite sides of the said gap for securing the said yoke in position.

3. In a driving connection for a dual tired pneumatic truck wheel, the combination of a felloe having a gap in the radially outer face thereof capable of passing the inflating nipple of the inboard tire, said felloe having circumferential stop-means located toward its outboard side, an outboard tire rim constructed to pass over the outboard end of the wheel to seat against the stop means, said rim having an inclined seat face facing the outboard side, said tire-rim having driving means located in the gap and projecting radially inwardly, a yoke having tongues with inclined faces for engaging the inclined seat face of the tire rim, and having substantially radial driving means for engaging the driving faces of the rim, and studs located on opposite sides of the said gap for forcing the tire rim toward the stop means.

4. In a driving connection for a dual tired pneumatic truck wheel, the combination of a felloe having a gap in the radially outer face thereof passing from the outboard side of the wheel to the inboard side and capable of passing the inflating nipple of the inboard tire, an inboard tire rim having a seat face seating on the felloe and having driving means engaging the sides of said gap, an outboard tire rim having driving means on it radially inner face located at the said gap, detachable means for engaging the last named driving means, and an integral bar at the outboard side of the wheel conforming to the gap and connecting the felloe across the said gap.

5. In a driving connection for a dual tired pneumatic truck wheel, the combination of a felloe having a gap in the radially outer face thereof capable of passing the inflating nipple for the inboard tire, a tire rim seating on the felloe and having driving means located in the gap and projecting radially inwardly, a yoke having driving faces for engaging the driving means of the rim on opposite sides of the gap, and studs located on opposite sides of the said gap for securing the said yoke in position, said yoke having a pair of dogs projecting from the inboard face thereof and engaging the side faces of the gap.

6. In a driving connection for a dual tired pneumatic truck wheel, the combination of a felloe having a gap in the radially outer face thereof capable of passing the inflating nipple of the inboard tire, a tire rim seating on the felloe and having driving means located in the gap and projecting radially inwardly, a yoke having driving faces for engaging the driving means of the outboard rim on opposite sides of the gap, and studs located on opposite sides of the said gap for securing the said yoke in position, said yoke having a cross bar disposed circumferentially with respect to the center of the wheel and having a pair of dogs projecting toward the inboard side of the wheel from the inboard face of the yoke and engaging the side faces of the said gap.

7. In a driving connection for a pneumatic tired truck wheel, the combination of a felloe having a gap in the radially outer face thereof passing from the outboard side of the wheel to the inboard side, an inboard tire rim having a seat face seating on the felloe and having driving means engaging the sides of said gap at its inboard end, said gap being capable of passing the inflating nipple for the inboard tire and rendering the same accessible through the gap from the outboard side of the wheel, an outboard tire rim having driving means on its radially inner face located at the said gap, and detachable outboard driving means for engaging the last named driving means, and located at the gap, said outboard detachable driving means operating when detached, to permit the driving means on the inboard rim to be passed through to the inboard side of the wheel.

8. In a driving connection for a truck wheel, the combination of a felloe having a gap in the radial outer face thereof passing from the outboard side of the wheel to the inboard side, an inboard tire rim having a seat face seating on the felloe and having a pair of driving lugs extending inwardly and engaging the sides of said gap at its inboard end, said gap being capable of passing the inflating nipple for the inboard tire and rendering the same accessible through the gap from the outboard side of the wheel, an outboard tire rim having driving lugs on its radially inner face located adjacent the sides of the said gap, a yoke conforming to the gap for securing the outboard rim on the felloe and engaging its driving lugs, said yoke operating when detached, to permit the driving means on the inboard rim to be passed through to the inboard side of the wheel, and means located on opposite sides of the said gap for securing the said yoke in position.

Signed at Los Angeles, California, this 18th day of October, 1930.

LLOYD D. KAY.